United States Patent
Krishnamoorthy

(10) Patent No.: US 11,775,513 B2
(45) Date of Patent: *Oct. 3, 2023

(54) DATABASE MANAGEMENT FOR SOUND-BASED IDENTIFIERS

(71) Applicant: T-Mobile USA, Inc., Bellevue, WA (US)

(72) Inventor: Arvind Ram Krishnamoorthy, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,803

(22) Filed: Oct. 17, 2022

(65) Prior Publication Data
US 2023/0037754 A1 Feb. 9, 2023

Related U.S. Application Data

(63) Continuation of application No. 17/167,299, filed on Feb. 4, 2021, now Pat. No. 11,487,754.

(51) Int. Cl.
*G06F 16/00* (2019.01)
*G06F 16/2452* (2019.01)
(Continued)

(52) U.S. Cl.
CPC ...... *G06F 16/24522* (2019.01); *G06F 16/235* (2019.01); *G06F 16/285* (2019.01); *G06F 16/29* (2019.01)

(58) Field of Classification Search
CPC ............. G06F 16/24522; G06F 16/235; G06F 16/285; G06F 16/29; G06F 16/3343
See application file for complete search history.

(56) References Cited

U.S. PATENT DOCUMENTS

2014/0108252 A1* 4/2014 Itwaru ............... G06Q 20/3276 705/44
2016/0253679 A1* 9/2016 Venkatraman ..... G06Q 30/0185 705/310

(Continued)

OTHER PUBLICATIONS

Office Action for U.S. Appl. No. 17/167,299, dated Feb. 17, 2022, Krishnamoorthy, "Database Management for Sound-Based Identifiers", 20 pages.

*Primary Examiner* — Dinku W Gebresenbet
(74) *Attorney, Agent, or Firm* — Lee & Hayes, P.C.

(57) ABSTRACT

Described herein are techniques, devices, and systems for database management using sound-based identifiers. The sound-based identifiers can be encoded based on text-based identifiers input into one or more databases. The sound-based identifiers can be preprocessed and encoded by encoding the text-based identifiers with a double metaphone algorithm. First sound-based identifiers can be sorted in a cluster associated with a node of a hybrid prefix tree list, based on a longest common prefix of the group. The first sound-based identifiers can be re-encoded as second sound-based identifiers and organized into sub-clusters associated with nodes, based on characters of the second sound-based identifiers positioned after characters associated with the clusters. The re-encoded sound-based identifiers can be determined based on metadata. A query can be received and utilized to identify a re-encoded sound-based identifier. Data associated with the re-encoded sound-based identifier can be transmitted based on the query.

20 Claims, 6 Drawing Sheets

(51) Int. Cl.
*G06F 16/29* (2019.01)
*G06F 16/23* (2019.01)
*G06F 16/28* (2019.01)

(56) References Cited

U.S. PATENT DOCUMENTS

2017/0206272 A1* 7/2017 Neela ................... G06F 16/3343
2020/0278987 A1* 9/2020 Liu ..................... G06F 16/90324

* cited by examiner

| Identifier Numbers 302 | Identifier Names 304 |
|---|---|
| 00001 | Maple |
| 00002 | Mapple |
| 00003 | Maple Consulting |
| 00004 | Maplecrest Art Galleries |
| 00005 | Maplecrest Realty |
| 00006 | Maple Crest Flowers |
| 00007 | Maple Quality Hardware |
| 00008 | Mapleview Sporting Goods |
| 00009 | Mapleview Sports Management |
| 00010 | Mapleview Coffee |

| Identifier Numbers 302 | Identifier Names 304 | Pre-Processed Names 306 |
|---|---|---|
| 00001 | Maple | MPL |
| 00002 | Mapple | MPL |
| 00003 | Maple Consulting | MPLSTG |
| 00004 | Maplecrest Art Galleries | MPLCSRT |
| 00005 | Maplecrest Realty | MPLCRTY |
| 00006 | Maple Crest Flowers | MPLCF |
| 00007 | Maple Quality Hardware | MPLQH |
| 00008 | Mapleview Sporting Goods | MPLVGDS |
| 00009 | Mapleview Sports Management | MPLVM |
| 00010 | Mapleview Coffee | MPLVWF |

FIG. 3

DATABASE MANAGEMENT FOR SOUND-BASED IDENTIFIERS

RELATED APPLICATIONS

This application is a continuation of and claims priority to U.S. patent application Ser. No. 17/167,299, filed Feb. 4, 2021, titled "DATABASE MANAGEMENT FOR SOUND-BASED IDENTIFIERS," the entirety of which is incorporated herein by reference.

BACKGROUND

Databases are utilized to organize large quantities of data associated with various types information and retrieve portions of the data based on queries. For example, data is stored, modified, or retrieved from a database based on a request generated as a query. The query can be implemented as command language processed by a computer program to select, insert, and/or update the data. Though databases are utilized to manage groups of interrelated data, inconsistencies in how the data in the groups is organized and identified can result in inefficient processing of queries and/or incomplete query results.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 3 illustrates an algorithm for database management for sound-based identifiers, in accordance with some examples of the present disclosure.

DETAILED DESCRIPTION

Figure 1:
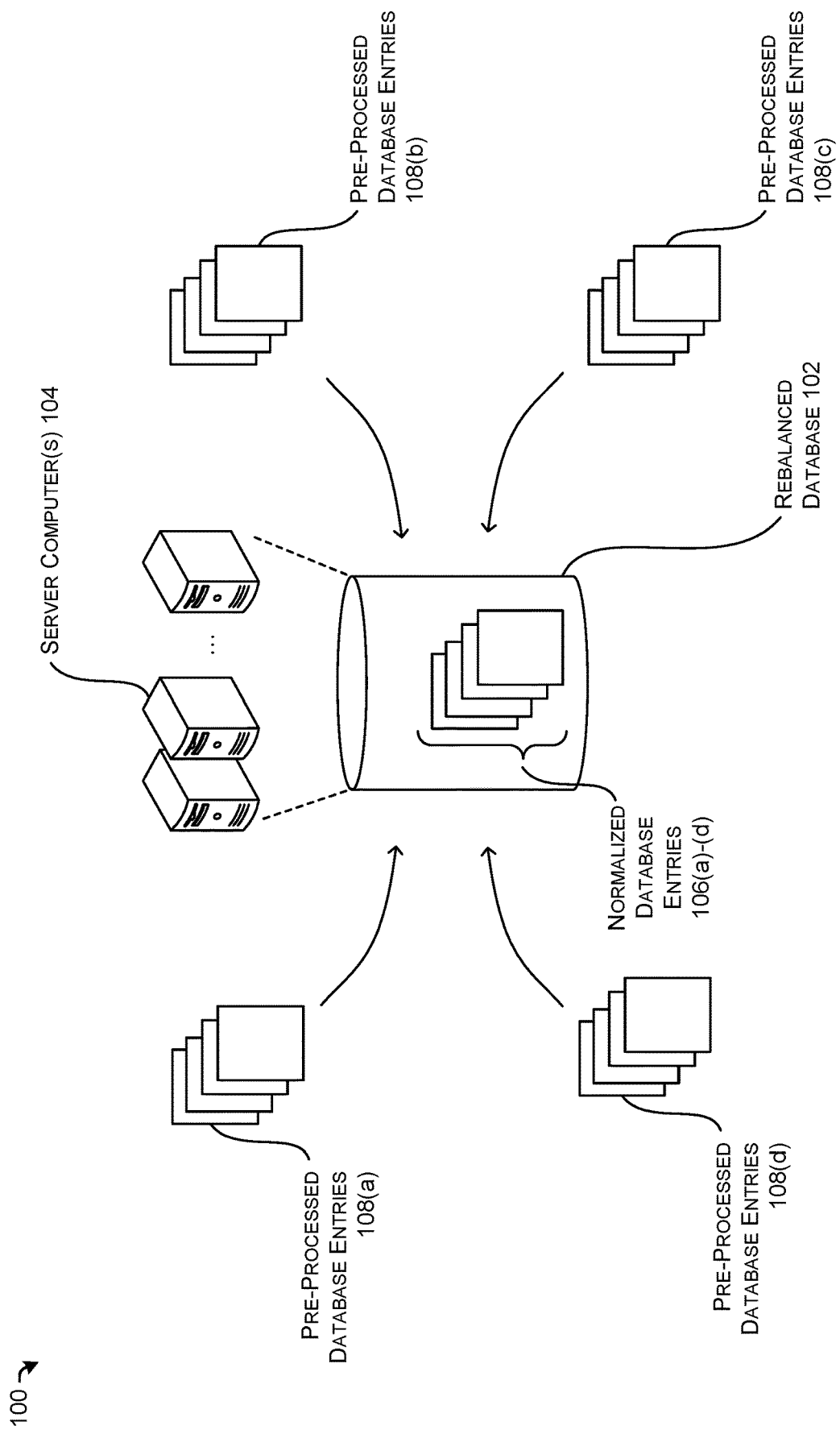
FIG. 1 illustrates a computing environment, in accordance with some examples of the present disclosure.

Described herein are techniques and systems for database management for sound-based identifiers. For example, one or more applications can receive one or more commands to identify text-based identifiers and encode the text-based identifiers as sound-based identifiers. The text-based identifiers can be input into one or more databases and can be associated with vendors. The sound-based identifiers can be encoded by preprocessing and encoding, with a double metaphone algorithm, the text-based identifiers as the sound-based identifiers. The sound-based identifiers can be sorted, in clusters associated with nodes of a hybrid prefix tree list, based on a longest common prefix of the sound-based identifiers. The sound-based identifiers can be encoded, re-encoded, and organized into the nodes based on metadata. The application(s) can receive a query (e.g. a request) and identify data associated with a sound-based identifier. The application(s) can transmit the data to a computing device.

In some examples, the application(s) can be configured to operate on one or more sever computers and can receive the command(s) to identify the text-based identifiers. The text-based identifiers can be input into one or more databases and can be associated with any entity. Entities with which the text-based identifiers input into the one or more databases are associated can include vendors. The text-based identifiers can be generated by preprocessing the text-based identifiers, notwithstanding vendor names being previously unknown. The names of the vendors can be extracted from a list of strings received by the server computer(s) and then grouped. Different text-based identifiers can be associated with multiple vendor names and can be associated with a same vendor.

The text-based identifiers can be encoded as the sound-based identifiers, with a double metaphone algorithm. Each of the sound-based identifiers can be an unambiguous sound-based representation of a name of a vendor. The sound-based identifiers can be sorted, in clusters and/or sub-clusters associated with nodes of a hybrid prefix tree list, based on a longest common prefix of the sound-based identifiers. Each of the nodes can be associated with an array of strings. The array can be defined as a cluster. Each of the sound-based identifier(s) can be associated with a string of the array of strings. Each of the nodes can be represented as a character associated with the sound-based identifier(s).

By encoding the text-based identifiers as the sound-based identifiers, names stored as the text-based identifiers can be converted to shortened versions of the names stored as the sound-based identifiers. The sound-based identifiers can be stored in clusters to group together names associated with sound-based identifiers. The names that are grouped together can be related as being associated with a same vendor. A group of names associated with sound-based identifiers in a tier (e.g., a first tier) of nodes can include names associated with a same vendor. The first tier can include one group associated with a node.

A subset of the sound-based identifiers can be associated with a cluster. A remaining subset of the sound-based identifiers can be re-encoded and organized into sub-clusters associated with nodes. The re-encoded sound-based identifiers can be organized into the sub-clusters, based on characters (e.g., letters) of the re-encoded sound-based identifiers positioned after characters associated with the clusters. The re-encoded sound-based identifiers can be organized into the sub-clusters based on metadata.

By re-encoding and organizing, into sub-clusters, remaining sound-based identifiers other than the sound-based identifiers grouped and sorted into the first tier, the remaining sound-based identifiers can be separated out from the sound-based identifiers of the first tier. Each group of names associated with sound-based identifiers in a tier (e.g., a second tier) of nodes determined subsequent to the first tier can be associated with a same vendor. The second tier can include one or more groups respectively associated with nodes. By re-encoding and organizing, into sub-clusters, remaining sound-based identifiers other than the sound-based identifiers grouped and sorted into the first tier or the second tier, the remaining sound-based identifiers can be separated out from the sound-based identifiers of the first tier, the second tier, and any other tiers subsequently determined. Each group of names associated with sound-based identifiers in a tier (e.g., a third tier) of nodes determined subsequent to the second tier can be associated with a same vendor. The third tier can include one or more groups respectively associated with nodes.

In some examples, re-encoding of sound-based identifiers can be repeated and/or iteratively performed any number of times. The re-encoding can be performed to determine any number of tiers, with each of the tiers including at least one node and sound-based identifier associated with the at least one node. The re-encoding can continue until all of the sound-based identifiers are sorted into a tier.

An application can receive a query (e.g., a request) and retrieve data associated with a sound-based identifier. The data can be retrieved from a database including the sound-based identifiers organized into the clusters and/or the sub-clusters. Each of the clusters and/or the sub-clusters can include a root-to-leaf path of nodes of a prefix tree, and an array of strings at a node of the tree. The application can transmit the data to a computing device.

The techniques discussed herein can improve a functioning of a computing device in a number of ways. As the entries (e.g. sound-based identifiers) of the database can be determined by analyzing data associated with the vendors, computational resources can be conserved and reallocated. For example, the computational resources that can be conserved and reallocated include resources that would otherwise be required by different conventional systems (e.g., machine learning model system), such as for training the such systems. By normalizing names associated with vendors and determining the sound-based identifiers as the normalized names, time delays required for operation of other systems (e.g., delays for training machine learning model systems) can also be avoided. The techniques discussed herein can facilitate identification of the normalized names even though vendor names are previously unknown to the computing system operating the database.

The systems, devices, and techniques described herein can be implemented in a number of ways. References are made to the accompanying drawings that form a part hereof, and in which are shown by way of illustration specific configurations or examples, in which like numerals represent like elements throughout the several figures.

Illustrative Systems for Database Management for Sound-Based Identifiers

FIG. 1 illustrates a computing environment 100, in accordance with some examples of the present disclosure. The computing environment 100 can include a rebalanced database 102. The computing environment 100 is illustrated in simplified form and can include many more components.

The rebalanced database 102 can be stored and/or operated by one or more server computers 104. The server computer(s) 104 can store and/or operate one or more applications. The applications can receive and/or process one or more command(s) associated with the rebalanced database 102.

The rebalanced database 102 can include normalized database entries 106 (e.g., normalized database entries 106(a)-(d)) determined based on pre-processed database entries 108 (e.g., pre-processed database entries 108(a)-(d)). The command(s) processed by the server computer(s) 104 can be utilized to determine (e.g., generate, manage, and/or update) the pre-processed database entries 108.

In some examples, each entry of the pre-processed database entries 108 (e.g., the pre-processed database entries 108(a)) can be determined as a sound-based identifier associated with a text-based identifier. In other examples, each of the pre-processed database entries 108 can include the sound-based identifier along with the text-based identifier and/or data associated with the text-based identifier. The pre-processed database entries 108 can be stored in the server computer(s) 104 as part of the rebalanced database 102 and/or a different database. The pre-processed database entries 108 can include the text-based identifier being stored along with, or separate from, the data associated with the text-based identifier. The text-based identifier can be associated with a vendor (e.g., supplier). For example, the text-based identifier can be a name of the vendor. Each of the pre-processed database entries 108 can be associated with a same or different vendor as any of the other pre-processed database entries 108.

The pre-processed database entries 108 can include the sound-based identifiers being determined by pre-processing the text-based identifiers. In some examples, the text-based identifiers can be determined by generating each of the text-based identifiers based on the data associated with the vendor. The data associated with the vendor can be analyzed to determine the name associated with the vendor. For example, the name associated with the vendor can be included in the data associated with the vendor.

The pre-processed database entries 108 can be utilized to determine one or more of the normalized database entries 106, based on data associated with the vendors. By way of example, one or more of the pre-processed database entries 108(a) can be associated with, and/or utilized to determine, the normalized database entry 106(a). The normalized database entry 106(a) can be determined based on one or more vendor names associated with the pre-processed database entries 108(a).

In some examples, the normalized database entry 106(a) can be determined as an identifier (e.g., sound-based identifier) (e.g., normalized name) associated with the one or more vendor names associated with the pre-processed database entries 108(a). The normalized database entries 106 can be determined notwithstanding any and/or all of the vendor names being previously unknown to the rebalanced database 102 and/or to the database in which the pre-processed database entries 108 were stored. For example, the normalized database entries 106 can be determined, notwithstanding any and/or all database-oriented vendor names being previously unknown. The normalized database entries 106 can be managed, sorted, and/or updated utilizing the rebalanced database 102, based on data associated with the vendors. The normalized database entries 106 can be processed by, and/or stored in, the server computer(s) 104.

Although the pre-processed database entries 108 discussed above include four sets of entries (e.g., the pre-processed database entries 108(a)-(d)), implementation of the pre-processed database entries 108 is not limited as such and can include one or more sets of entries from which all of the normalized database entries 106 are determined. Alternatively, other entries from a same or different database can be utilized along with the pre-processed database entries 108 to determine the normalized database entries 106. Although a number of sets of entries in the pre-processed database entries 108 discussed above is the same as a number of entries in the normalized database entries 106, implementation of the pre-processed database entries 108 and/or the normalized database entries 106 is not limited as such. For example, any number of sets of entries in the pre-processed database entries 108 can be utilized to determine any number of entries in the normalized database entries 106. Although the pre-processed database entries 108(a) discussed above are utilized to determine the normalized database entry 106(a), implementation is not limited as such. For example, one or more entries from any of the pre-processed database entries 108(*a*)-(*d*) or any other pre-processed database entry managed utilizing a different database can be utilized to determine one or more entries of any normalized database entry (e.g., any of the normalized database entries 106(*a*)-(*d*)) in the rebalanced database 102 or any entry (e.g., normalized database entry) managed utilizing a different database.

Although the term "database" is used throughout the disclosure, it is not limited as such. Features as discussed in any part of the disclosure related to a "database" can be similarly implemented with data (e.g., a dataset) of any other type. For example, any database entry discussed herein can be a dataset entry.

Therefore, and as described herein, pre-processed database entries and normalized database entries can be determined as sound-based identifiers based on text-based identifiers associated with vendors. The sound-based identifiers can be related to the vendor names. The sound-based identifiers can be determined based on the vendor names being previously unknown to the computing system operating the database. The normalized database entries can be determined based on the sound-based identifiers and utilized to ensure data is organized and identified appropriately. Inconsistencies in how data is organized and identified can be prevented. For example, inconsistencies including variations in abbreviations of named entities (e.g., suppliers), misspellings of named entities, and variations in additional information appended to the named entities can be eliminated.

Furthermore, by determining the sound-based identifiers based on the data associated with the vendors, limitations of conventional technology associated with machine learning models can be mitigated and/or avoided. Though other systems (e.g., systems utilizing machine learning models) can be trained to determine a vendor name associated with a database entry, such systems require computational resources and time delays that are not required for determining the entries in the rebalanced database described herein.

Figure 2:
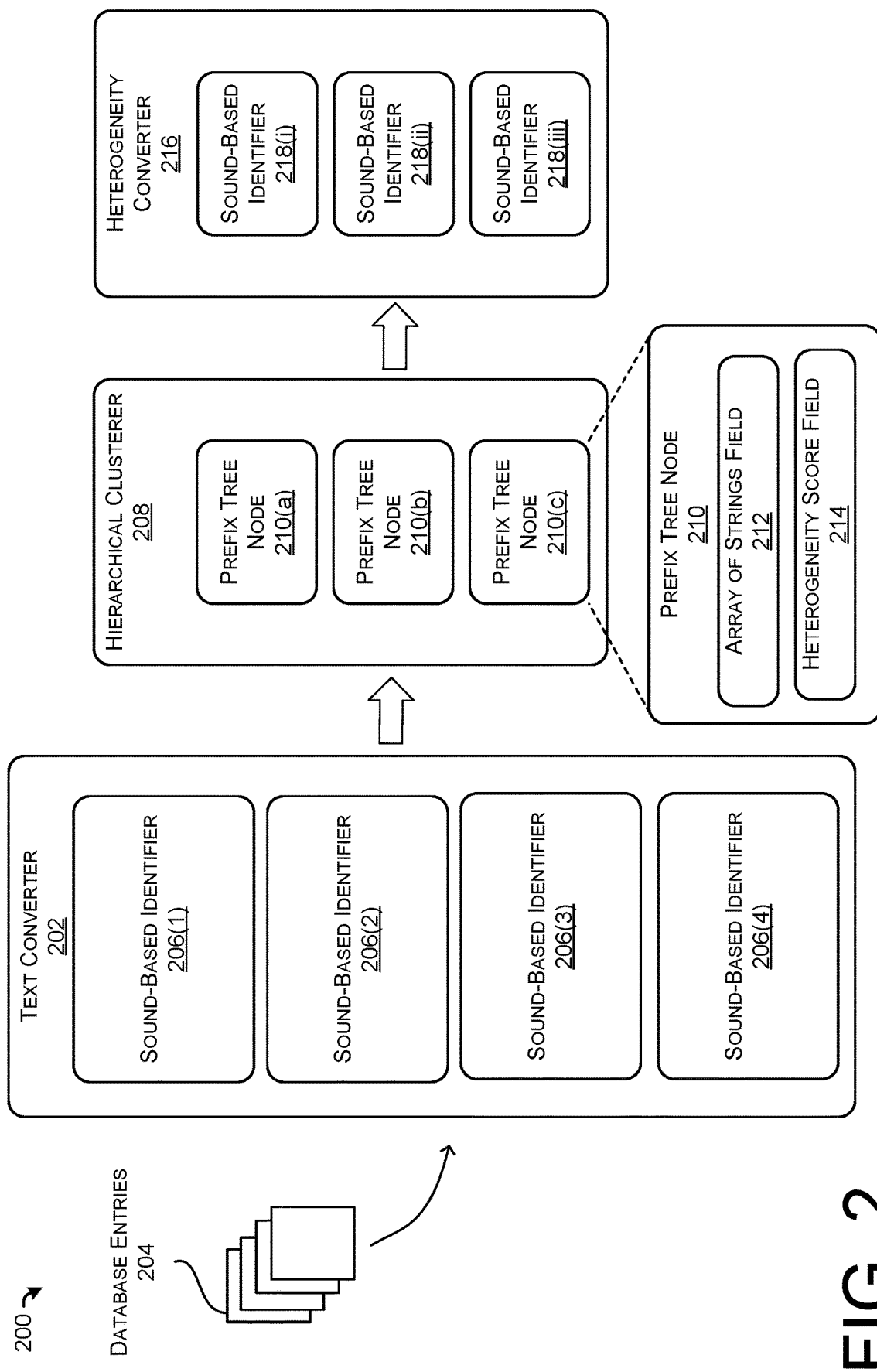
FIG. 2 illustrates an algorithm for database management for sound-based identifiers, in accordance with some examples of the present disclosure.

FIG. 2 illustrates an algorithm 200 for database management for sound-based identifiers, in accordance with some examples of the present disclosure. In this example, a text converter 202 can receive database entries 204, determine sound-based identifiers 206 (e.g., a sound-based identifier 206(1), a sound-based identifier 206(2), a sound-based identifier 206(3), and a sound-based identifier 206(4)), and output pre-processed database entrees based on the sound-based identifiers 206. In some examples, each of the sound-based identifiers 206 can be utilized to implement any of the sound-based identifiers in the pre-processed database entries 108 discussed above with reference to FIG. 1.

Each entry of the database entries 204 can be stored, managed, and/or received by utilizing a same or different database as a database utilized to store and/or manage any identifier of the sound-based identifiers 206 (e.g., first or encoded sound-based identifier). Each entry of the database entries 204 can be stored, managed, and/or received by utilizing a same or different database as any other entry of the database entries 204. In some examples, each entry of the database entries 204 can be associated with a vendor. In those examples, the vendor associated with each entry of the database entries 204 can be the same as the vendor associated with another entry of the database entries 204. However, although the vendor associated with one or more of the database entries 204 can be the same, vendor names associated with the database entries can be different with respect to any other entry. Alternatively or additionally, vendor related data that is associated with the one or more entries can be different with respect to any other entry.

The text converter 202 can receive and convert text-based identifiers in the database entries 204 to the sound-based identifiers 206. In some examples, each of the text-based identifiers in the database entries 204 can be implemented as any identifier of the text-based identifiers utilized to determine the sound-based identifiers associated with the pre-processed database entries 108 discussed above with reference to FIG. 1.

In some examples, the text converter 202 can be utilized to determine the sound-based identifiers 206 based on the text-based identifiers being input to a computing system. The text-based identifiers input to the computing system can be received via manual entry (e.g., input from a keyboard, a document scanner, a quick response (QR) scanner, a barcode scanner, a radio-frequency identification (RFID) scanner, a different computing system, etc.) and/or automatic entry (e.g., a prescheduled/predetermined input and/or other type of preprogrammed input from the computing system and/or a different computing system, etc.). In some instances, one or more words in a text-based identifier in the database entries 204 associated with a vendor can be different than in another identifier in the database entries 204 associated with the same vendor. In those instances, the word(s) in the text-based identifier that are different than in the other text-based identifier can be included in a name of the vendor. Alternatively or additionally, a spelling of one or more the word(s) can be different notwithstanding some or all of the word(s) being the same.

The sound-based identifiers 206 can be determined based on the text-based identifiers by utilizing a double metaphone algorithm to reduce initial variations of names associated with a vendor. The double metaphone algorithm can be utilized to determine partially or fully unambiguous sound-based representations (e.g., tokens) of the text-based identifiers. For example, one or more of the text-based identifiers can be associated with the same vendor. The double metaphone algorithm can be utilized to analyze and identify the text-based identifiers that include different names associated with the same vendor. By utilizing the double metaphone algorithm, the variation between vendor names associated with the sound-based identifiers 206 can be reduced.

In some examples, a hierarchical clusterer 208 can determine prefix tree nodes 210 (e.g., a prefix tree node 210(*a*), a prefix tree node 210(*b*), and a prefix tree node 210(*c*)) based on the sound-based identifiers 206. The hierarchical clusterer 208 can be utilized to determine each of the prefix tree nodes 210 included in a prefix tree. By way of example, each of the prefix tree nodes 210 included in the prefix tree can be associated with one or more of the sound-based identifiers 206. Each of the prefix tree nodes 210 associated with the sound-based identifier(s) 206 can be represented as a character of the sound-based identifier(s) 206. For example, a first prefix tree node of the prefix tree nodes 210 can be associated with a first character of all of the sound-based identifiers 206. The first character can be associated with a vendor associated with each of the sound-based identifiers 206. The first character can be associated with the same vendor or with two or more different vendors.

Any of the prefix tree nodes 210 can be associated with an array of strings field 212 and a heterogeneity score field 214. For example, each string associated with the array of strings field 212 can be associated with a sound-based identifier 206. Each string can include characters of the sound-based identifier 206 representing a vendor name. Each string of an array (e.g., cluster) associated with one of the array of strings fields 212 can be associated with the same vendor that is associated with remaining strings in the array. The sound-based identifiers associated with the strings in the array of strings field 212 can be different based on the sound-based identifiers representing different vendor names. For example, the array of strings field 212 in one of the prefix tree nodes 210 can be associated with a vendor and with one or more names of the vendor.

Each sound-based identifier can be stored in a portion of memory of the server computer(s) that is a size (e.g., a first size) that is the same or different from a size (e.g., a second size) of a portion of memory in which the text-based identifier is stored. For example, the first size (e.g., 0.1, megabyte ("MB"), 1 MB, 10 MB, etc.) can be smaller than the second size (e.g., 0.1, megabyte ("GB"), 1 GB, 10 GB, 63 GB, etc.) due to the sound-based identifier being smaller than the text-based identifier. By utilizing the sound-based identifiers instead of the text-based identifiers, the portion of memory set aside or designed for storing any of the sound-based identifiers can be smaller than the portion of memory that would otherwise need to be set aside or designed for storing a corresponding text-based identifier.

The heterogeneity score field 214 associated with the prefix tree node 210 can include a score utilized to rebalance the prefix tree. For example, the score (e.g., heterogeneity score) associated with a heterogeneity score field 214 can be utilized to determine the prefix tree node 210 is a non-leaf node or a leaf node. The heterogeneity score field 214 can be utilized to indicate that the prefix tree node 210 is a non-leaf node based on an absence of strings in the array of strings field 212 that include suffixes. The heterogeneity score field 214 can be utilized to indicate that the prefix tree node 210 is a leaf node based on one or more strings in the array of strings field 212 including suffixes.

In some examples, the heterogeneity score can be utilized as an alert to determine whether a cluster needs to be split. For each of the clusters, the heterogeneity score associated with a cluster can be derived by computing an average of a modified version of a Gower Distance for all elements (e.g., sound-based identifiers) within the cluster. The Gower Distance between any two elements can be determined by calculating a value of a term of the heterogeneity scores for all of relevant metadata of each of the elements.

In a case in which the metadata associated with each of two sound-based identifiers is a Boolean value, the term of the heterogeneity score is set as 1 if values of metadata associated with both of the two sound-based identifiers are different; or the term is set as a term associated with the metadata is set as 0 if values of the metadata associated with both of the two sound-based identifiers are the same (e.g., Sørensen-Dice coefficient).

In a case in which the metadata associated with each of two sound-based identifiers is one or more characters, then the term is a normalized Jaro-Winkler distance. The normalized Jaro-Winkler distance can be determined between values of metadata associated with the two sound-based identifiers.

In a case in which the metadata associated with each of two sound-based identifiers is numeric, then the term of the heterogeneity score can be calculated as a Manhattan Distance. The Manhattan Distance is determined as a normalized absolute value of a difference between values of the metadata associated with two sound-based identifiers divided by a range of the two values. All terms associated with the cluster can be summed and divided by a predetermined number of metadata columns to obtain a pair-wise Gower Distance. All of the Gower Distances can be averaged and a result of averaging the Gower Distances can be determined as the Heterogeneity score. The Heterogeneity score can be an indication of how impure a cluster is (e.g., a degree to which dissimilar items (sound-based identifiers) have been grouped together). For example, a Heterogeneity score associated with items within any of the clusters that are dissimilar can be set higher than a Heterogeneity score associated with items within another cluster that are similar. The system is alerted for further processing based on a Heterogeneity score being higher than for another Heterogeneity score. Further processing can include determining that at least one of the sound-based identifiers associated with the cluster do not belong to the tier in which the cluster is grouped, and instead belong to a sub-cluster in a tier that is subsequently determined. For example, if the heterogeneity score of the cluster is determined to be lower than a threshold of 0.50, then splitting and re-encoding of the cluster occurs is performed. In some examples, a heterogeneity score can be determined for any sub-cluster in a similar way as discussed above for a cluster.

In some examples, determining the prefix tree can omit determining the heterogeneity score. In those examples, instead of explicitly determining the heterogeneity score, the heterogeneity score can be implicitly determined and utilized to determine the nodes for sorting the sound-based identifiers. The heterogeneity score field 214 can be omitted based on the heterogeneity score being implicitly calculated by determining whether a cluster needs to be split. The heterogeneity score can be implicitly calculated without explicitly calculating the heterogeneity score, by determining implicitly whether the cluster needs to be split into at least one sub-cluster in a subsequent tier.

In some examples, a heterogeneity converter 216 (e.g., a heterogeneity reconciler) can determine sound-based identifiers 218 (e.g., second sound-based identifiers (e.g., re-encoded sound-based identifiers)) (e.g., a sound-based identifier 218(i), a sound-based identifier 218(ii), and a sound-based identifier 218(iii)) based on the prefix tree nodes 210. The heterogeneity converter 216 can determine each of the sound-based identifiers 218 based on one of the prefix tree nodes 210. For example, each of the sound-based identifiers 218 can be associated with one of the array of strings fields 212, and with the same vendor associated with the array of strings field 212. The sound-based identifiers 218 can be determined and utilized to replace the sound-based identifiers 206 associated with the array of strings field 212. For example, one of the sound-based identifiers (e.g., the sound-based identifier 218(i)) can be determined based on one of prefix tree nodes (e.g., the prefix tree node 210(a)), which can be determined based on one or more of the sound-based identifiers 206 (e.g., the sound-based identifier 206(1), the sound-based identifier 206(2), the sound-based identifier 206(3), and the sound-based identifier 206(4)). In some examples, each of the sound-based identifiers 218 can be utilized to implement any of the sound-based identifiers in the normalized database entries 106 discussed above with reference to FIG. 1. A computing system utilized to process each of the text converter 202, the hierarchical clusterer 208, and the heterogeneity converter 216 can be the same computing system, Or, the computing system utilized to process any of the text converter 202, the hierarchical clusterer 208, and the heterogeneity converter 216 can be different from any of the others. For example, the computing system can be the server computer(s) 104 discussed above with reference to FIG. 1, or a different computing system.

Therefore, and as described herein, a text converter, a hierarchical clusterer, and a heterogeneity converter can be utilized to determine a re-encoded sound-based identifier. The re-encoded sound-based identifier can be determined and utilized as a single name of a vendor. The re-encoded sound-based identifier can be utilized to replace the different sound-based identifiers utilized to determine the re-encoded sound-based identifier. The re-encoded sound-based identifier can be utilized as the vendor name instead of the sound-based identifiers associated with different vendor names. By utilizing the re-encoded sound-based identifier, consistent and efficient search results can be obtained via queries to the database. The queries can utilize the re-encoded sound-based identifier to effectively obtain data with complete information about the vendor.

FIG. 3 illustrates an algorithm 300 for database management for sound-based identifiers, in accordance with some examples of the present disclosure. The algorithm 300 can be utilized to associate identifier numbers 302 with identifier names 304, and to determine pre-processed names 306 (e.g., tokens) based on the identifier names 304. Each of the identifier numbers 302 can be associated with one name of the identifier names 304, and with one of the pre-processed names 306 associated with the name. In some examples, each of the identifier names 304 can be implemented as any of the text-based identifiers in the database entries 204 discussed above with reference to FIG. 2. In some examples, each of the pre-processed names 306 can be implemented as any of the sound-based identifiers 206 discussed above with reference to FIG. 2.

Each of the identifier names 304 can be associated with a vendor and a name of the vendor. More than one of the identifier names 304 associated with a vendor (e.g., "Maple") can be associated with different names associated with the vendor (e.g., "Maple," "Mapple," and "Maple Consulting"). The different names in the identifier names 304 can include one or more names of different versions (e.g., "Maple Consulting") and/or one or more names with different spellings (e.g., misspellings (e.g., "Mapple")) than any of the remaining names (e.g., "Maple"). For example, the one or more names of different versions and/or the one or more names with different spellings can be input into the algorithm 300 due to variations based on manual entry and/or automatic entry. The names can include one or more names of versions based on accidental/incidental entries and/or can include one or more names of versions (e.g., versions with accidental/incidental variations) (e.g., a name can be typed wrong during manual entry via a keyboard). The names of different versions can be based on purposes, usages, and/or requirements of databases into which the names are input and utilized to determine the identifier names 304. For example, the names can include one or more names of different versions (e.g., versions with intentional/deliberate variations) including a name (e.g., "Maple") associated with a database (e.g., a financial database) and a name (e.g., "Maple Consulting") of a different version associated with a database (e.g., services database) of a different type.

In some examples, one or more of the identifier names 304 can be associated with data managed by a database. Data associated with one or more identifier names 304 for a vendor can be associated with the same vendor. Alternatively or additionally, data associated with one or more identifier names 304 from a database of a type of information can be associated with the same type of information. For example, one or more identifier names 304 (e.g., "Maple," "Mapple," and "Maple Consulting") associated with a vendor (e.g., "Maple") and/or a database of a type (e.g., financial) of information can all be associated with data associated with the same vendor (e.g., "Maple") and/or the same type (e.g., financial, sales, etc.) of information. In some examples, data associated with each of the identifier names 304 can be implemented as data associated with a text-based identifier in any of the pre-processed database entries 108 discussed above with reference to FIG. 1.

The pre-processed names 306 can be determined based on the identifier names 304 and included, in a database entry, along with the identifier numbers 302 and the identifier names 304. One or more pre-processed names of the pre-processed names 306 can be determined to be associated with a same vendor based on business attributes (e.g., a type of business, business contact info, a tax code of a business, a city in which the business is headquartered, a method of payment utilized by the business, terms of payment associated with the business, a length of a relationship, etc.). In some examples, a database entry including each of the pre-processed names 306, along with an identifier number 302 and an identifier name 304 associated with the pre-processed name 306, can be implemented as any entry of the pre-processed database entries 108 discussed above with reference to FIG. 1.

In some examples, the pre-processed names 306 can be determined by utilizing a double metaphone algorithm, based on the identifier names 304. The pre-processed names 306 can be determined by pre-processing the identifier names 304, utilizing the double metaphone algorithm. By way of example, a pre-processed name 306 (e.g., "MPL") associated with a vendor (e.g., "Maple") can be determined by utilizing the double metaphone algorithm, based on an identifier name 304 (e.g., "Maple"). By way of example, a pre-processed name 306 (e.g., "MPL") associated with the vendor (e.g., "Maple") can be determined by utilizing the double metaphone algorithm, based on an identifier name 304 (e.g., "Mapple"). By way of example, a pre-processed name 306 (e.g., "MPLSTG") associated with the vendor (e.g., "Maple") can be determined by utilizing the double metaphone algorithm, based on an identifier name 304 (e.g., "Maple Consulting"). By way of example, a pre-processed name 306 (e.g., "MPLCSRT") associated with a different vendor (e.g., "Maplecrest Art Galleries") can be determined by utilizing the double metaphone algorithm, based on an identifier name 304 (e.g., "Maplecrest Art Galleries").

Although examples of pre-processed names 306 are discussed throughout the disclosure for purposes of simplicity and ease of understanding, the disclosure is not limited as such. By way of example, pre-processed names 306 determined by an algorithm (e.g., double metaphone algorithm) for vendor names can be determined as "MPL" for "Maple," "MPL" for "Mapple," "'MPLKNSLTNK'" for "Maple Consulting," "'MPLKRSTRTKLRS'" for "Maplecrest Art Galleries;" "'MPLKRSTRLT" for "Mapplecrest Realty," "'MPLKRSTFLRS" for "Maple Crest Flowers," "'MPLKLTRTR" for "Maple Quality Hardware," "'MPLFSPRTNKKTS" for "Mapleview Sporting Goods," "'MPLFSPRTSMNJMNT" or "MPLFSPRTSMNKMNT" for "Mapleview Sports Management," and "'MPLFKF'" for "Mappleview Coffee."

Therefore, and as described herein, a database can include entries with an identifier number, an identifier (e.g., vendor) name, a pre-processed name, and data. The identifier name and the data can be of a type based on a type of the database. The pre-processed name can be determined based on the identifier name and can vary from other pre-processed names that are associated with the same vendor, based on differences between the identifier names. The identifier names can include different names and/or the same names with different spellings based on how the identifier names are entered and subsequently input to the database. The differences can be based on the types of the databases and/or the types of the information retrievable via the data associated with the pre-processed name. The data can be stored in the same or a different database as the identifier name and/or the pre-processed name.

Furthermore, by pre-processing the vendor names, unambiguous sound-based representations of the vendor names can be utilized in place of the vendor names. By utilizing the sound-based representations of the vendor names, storage resources can be conserved due to the sound-based representations being smaller than of the vendor names. In addition, processing resources can be conserved because smaller representations of vendor names require less processing for searching a database to identify an entry in response to queries for information in the database.

Figure 4:
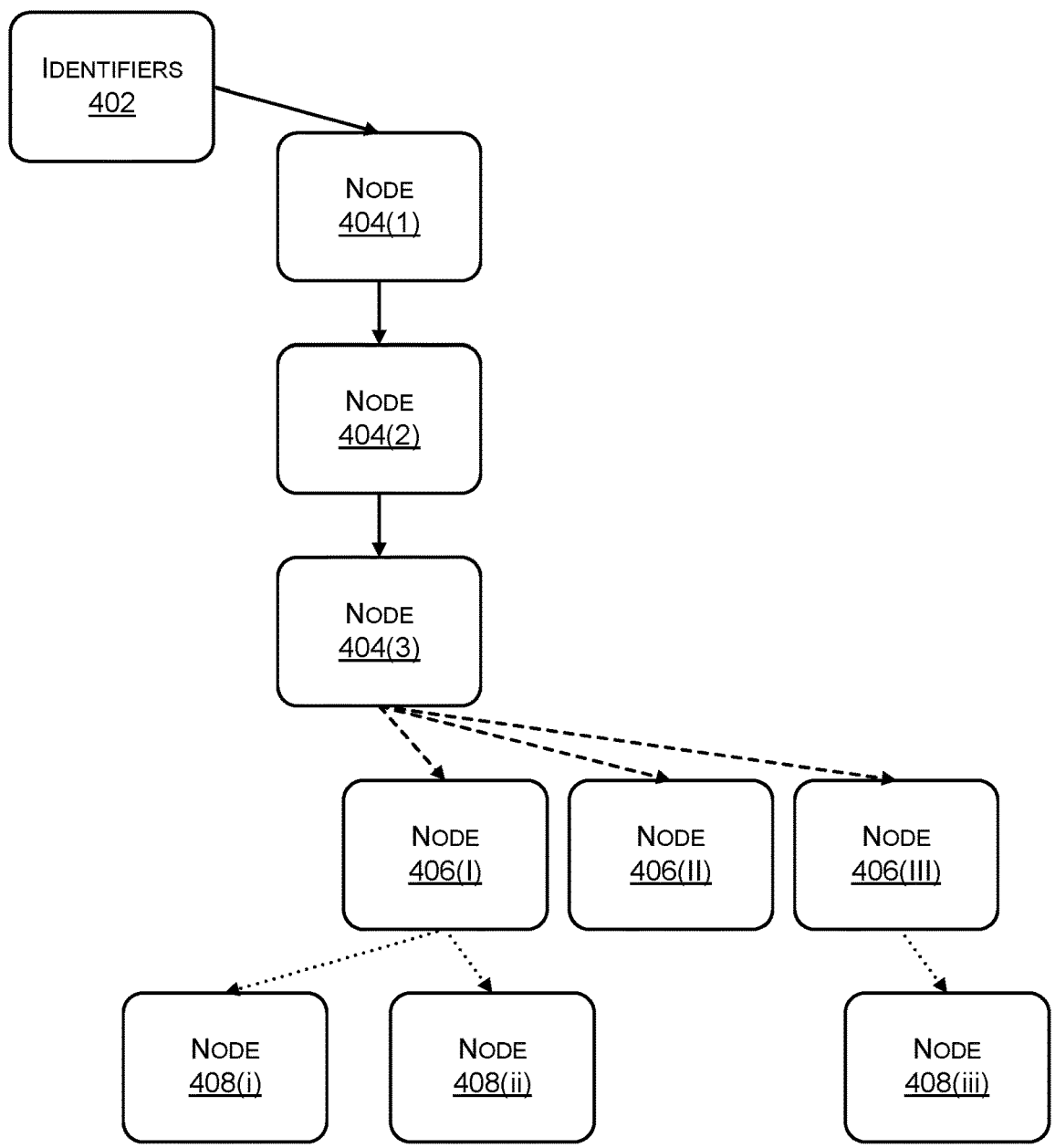
FIG. 4 illustrates an algorithm for database management for sound-based identifiers, in accordance with some examples of the present disclosure.

FIG. 4 illustrates an algorithm 400 for database management for sound-based identifiers, in accordance with some examples of the present disclosure. The algorithm 400 can utilize a prefix tree for a database for managing identifiers 402. In some examples, each of the identifiers 402 can be utilized to implement any of the identifiers (e.g., a text-based identifier and/or a sound-based identifier associated with one (e.g., a single entry) of the pre-processed database entries 108(a)) in the pre-processed database entries 108 discussed above with reference to FIG. 1.

The identifiers 402 can include sound-based identifiers (e.g., sound-based identifiers all initially included in a single large cluster) that are then managed utilizing the prefix tree. The sound-based identifiers in the identifiers 402 can be managed utilizing nodes 404 (e.g., node 404(1), node 404(2), and node 404(3)), nodes 406 (e.g., node 406(I), node 406(I), and node 406(I)), and nodes 408 (e.g., node 408(i), node 408(ii), and node 408(iii)). In some examples, each of the nodes 404, nodes 406, and nodes 408 can be utilized to implement any of the prefix tree nodes 210 discussed above with reference to FIG. 2.

In some examples, the identifiers 402 can be associated with text-based identifiers (e.g., a set of text-based identifiers). The nodes 404 can be associated with sound-based identifiers (e.g., a first subset of sound-based identifiers). The nodes 404, as well as the sound-based identifiers associated with the nodes 404, can be grouped in a tier (e.g., a first tier). The nodes 406 and/or the nodes 408 can be associated with sound-based identifiers (e.g., a second subset of sound-based identifiers). The nodes 406, as well as the sound-based identifiers associated with the nodes 406, can be grouped in a tier (e.g., a subsequent tier (e.g., a second tier)). The nodes 408, as well as the sound-based identifiers associated with the nodes 408, can be grouped in a tier (e.g., a subsequent tier (e.g., a third tier)).

The nodes 404 can be associated with a prefix (e.g., a prefix of at least one sound-based identifier) associated with vendors associated with the identifiers 402. For example, the nodes 404 can be associated with a longest common prefix (e.g., "MPL") associated with vendors (e.g., "Maple," "Maplecrest Art Galleries," "Maplecrest Realty," "Maple Crest Flowers," "Maple Quality Hardware," "Mapleview Sporting Goods," and "Mapleview Coffee") associated with the identifiers 402.

Each of the nodes 404 can be associated with a character of the prefix. For example, the node 404(1) can be associated with a character (e.g., a first character (e.g., "M")) of the largest common prefix; the node 404(2) can be associated with a character (e.g., a second character (e.g., "P")) of the largest common prefix; and the node 404(3) can be associated with a character (e.g., a third character (e.g., "L")) of the largest common prefix.

The nodes 406 can be associated with a suffix (e.g., a suffix of a sound-based identifier) associated with vendors associated with the identifiers 402. Each of the nodes 406 can be associated with a character of the suffix associated with the vendors associated with the identifiers 402. For example, the node 406(I) can be associated with a character (e.g., a first character (e.g., "C")) of a suffix (e.g., a character following a last character of the prefix) associated with one or more vendors (e.g., "Maplecrest Art Galleries," "Maplecrest Realty," and "Maple Crest Flowers"); the node 406(II) can be associated with a character (e.g., a first character (e.g., "Q")) of a suffix associated with one or more vendors (e.g., "Maple Quality Hardware"); and the node 406(III) can be associated with a character (e.g., a first character (e.g., "V")) of a suffix associated with one or more vendors (e.g., "Mapleview Sporting Goods" and "Mapleview Coffee").

The nodes 408 can be associated with a suffix (e.g., a suffix of a sound-based identifier) associated with vendors associated with the identifiers 402. Each of the nodes 408 can be associated with a character of the suffix associated with the vendors associated with the identifiers 402. For example, the node 408(i) can be associated with a character (e.g., a next character (e.g., "S")) of a suffix (e.g., a third character of the suffix) associated with one or more vendors (e.g., "Maplecrest Art Galleries"); the node 408(ii) can be associated with a character (e.g., a next character (e.g., "R")) of a suffix (e.g., a second character of the suffix) associated with one or more vendors (e.g., "Maplecrest Art Galleries"); and the node 408(iii) can be associated with a character (e.g., a next character (e.g., "W")) of a suffix associated with one or more vendors (e.g., "Mapleview Coffee").

In some examples, each of the nodes 404, the nodes 406, and the nodes 408 can be determined, in sequential order, to be associated with an array (e.g., an array in the array of strings field 212). Initially, each of the node 404(1), the node 404(2), and the node 404(3) can be determined to be associated with sound-based identifiers associated with strings in an array. In those examples, each of the node 404(1) and the node 404(2) can be determined to be associated with an array that is empty. In those examples, the node 404(3) can be determined to be associated with an array that includes a string (e.g., an empty string e.g., " ") (associated with a sound-based name (e.g., "MPL") having a last character ("L") that is the same as the character (e.g., "L") associated with the node; and the array associated with the node 404(3) can include and a string (e.g., "MPLSTG") associated with a sound-based name having at least one additional character (e.g., "STG") beyond the character (e.g., "L") associated with the node.

Based on the nodes 404 being determined to be associated with sound-based identifiers (e.g., subsequent to the nodes 404 being determined to be associated with the sound-based identifiers), the node 406(I), the node 406(II), and the node 406(III) can be determined to be associated with sound-based identifiers associated with strings in an array (e.g., a cluster or a sub-cluster). An evaluated flag associated with each of one or more of the nodes 404 (e.g., the node 404(3)) can be updated (e.g., changed from false to true) based on the nodes 404 being determined to be associated with the sound-based identifiers. The nodes 406 can be determined based on a character in the sound-based identifiers after the last character of the prefix (e.g., longest common prefix). The node 406(I) can be determined to be associated with an array that includes a string (e.g., "F") associated with a sound-based name (e.g., "MPLCF") having at least one additional character (e.g., "F") beyond the character (e.g., "C") associated with the node. In those examples, the node 406(II) can be determined to be associated with an array that includes a string (e.g., "QH") associated with a sound-based name (e.g., "MPLQH") having at least one additional character (e.g., "H") beyond the character (e.g., "Q") associated with the node. In those examples, the node 406(III) can be determined to be associated with an array that includes a string (e.g., "GDS") associated with a sound-based name (e.g., "MPLVGDS") having at least one additional character (e.g., "GDS") beyond the character (e.g., "V") associated with the node; and array associated with the node 406(III) can include a string (e.g., "M") associated with a sound-based name (e.g., "MPLVM") having at least one additional character (e.g., "M") beyond the character (e.g., "V") associated with the node.

Based on the nodes 406 being determined to be associated with sound-based identifiers (e.g., subsequent to the nodes 404 and the nodes 406 being determined to be associated with the sound-based identifiers), the nodes 408 (e.g., the node 408(*i*), the node 408(*ii*), and the node 408(*iii*)) can be determined to be associated with sound-based identifiers associated with strings in an array (e.g., a cluster or a sub-cluster). An evaluated flag associated with one or more of the nodes 406 (e.g., all of the node 406(1), the node 406(II), and the node 406(III)) can be updated (e.g., changed from false to true) based on the nodes 406 being determined to be associated with the sound-based identifiers. The nodes 408 can be determined based on a character in the sound-based identifiers after the last character of associated with one or more previous nodes.

In those examples, based on an array associated with one of the nodes 406 (e.g., node 406(I)) being determined to include one or more strings (e.g., "MPLCF") associated with a vendor, arrays associated with one or more of the nodes 408 can be determined to include one more remaining strings that include the same characters (e.g., "MPLC") associated with previous nodes and the one node (e.g., 406(I)). For example, an array associated with any of the nodes 408 (e.g., the node 408(*i*)) can be determined to include one or more strings (e.g., "MPLCSRT") associated with a same vendor; and an array associated with any of the nodes 408 (e.g., the node 408(*ii*)) can be determined to include one or more strings (e.g., "MPLCRTY") associated with a vendor.

In those examples, based on an array associated with one of the nodes 406 (e.g., node 406(III)) being determined to include one or more strings (e.g., "MPLVGDS" and "MPLVM") associated with a vendor, arrays associated with one or more of the nodes 408 can be determined to include one more remaining strings that include the same characters (e.g., "MPLV") associated with previous nodes and the one node (e.g., 406(III)). For example, an array associated with any of the nodes 408 (e.g., the node 408(*iii*)) can be determined to include one or more strings (e.g., "MPLVWF") associated with a vendor.

The node 408(*i*) can be determined to be associated with an array that includes a string (e.g., "RT") associated with a sound-based name (e.g., "MPLSRT") having at least one additional character (e.g., "RT") beyond the character (e.g., "S") associated with the node. In those examples, the node 408(*ii*) can be determined to be associated with an array that includes a string (e.g., "TY") associated with a sound-based name (e.g., "MPLCRTY") having at least one additional character (e.g., "TY") beyond the character (e.g., "R") associated with the node. In those examples, the node 408(*iii*) can be determined to be associated with an array that includes a string (e.g., "F") associated with a sound-based name (e.g., "MPLVWF") having at least one additional character (e.g., "F") beyond the character (e.g., "W") associated with the node. An evaluated flag associated with one or more of the nodes 408 (e.g., all of the node 408(*i*), the node 408(*ii*), and the node 408(*iii*)) can be updated (e.g., changed from false to true) based on the nodes 408 being determined to be associated with the sound-based identifiers. The evaluated flags associated with the nodes 404, the nodes 406, and the nodes 408 can be initially set as false.

In some examples, encoding (e.g., re-encoding) of the sound-based identifiers can continue until a terminal condition is satisfied (e.g., the re-encoding can cease based on a terminal condition being satisfied). The terminal condition for re-encoding can be satisfied based on, for each cluster or sub-cluster, the metadata values (e.g., values of the metadata) respectively associated with the cluster or sub-cluster being the same, or on the cluster or the sub-cluster being associated with, or utilized to determine, not more than one additional sub-cluster in a subsequent tier. For example, values of the metadata associated with the sound-based identifiers associated with the Node 408(*iii*) can be determined to be the same, based on the sound-based identifiers (e.g., "MPLVGDS" and "MPLVM") being associated with the same metadata values. Each sound-based identifier can be associated with at least one metadata value, which can be associated with a vendor (e.g., the at least one value of the metadata for the sound-based identifier can be associated with, and based on, the vendor).

Based on the prefix tree and all of the nodes (e.g., the nodes 404, the nodes 406, and the nodes 408) being determined, the sound-based identifiers can be re-encoded. The sound-based identifiers (e.g., second sound-based identifiers) can be re-encoded based on data. For example, the data utilized to re-encode the sound-based identifiers can include metadata associated with characteristics associated with the vendor (e.g., a highest amount of spent money associated with a vendor associated with a sound-based identifier, a length of a relationship (e.g., a longest relationship) associated with a vendor associated with a sound-based identifier, a tax identifier associated with a vendor associated with a sound-based identifier, etc.). A portion or type of metadata (e.g., metadata associated with a business attribute) utilized to re-encode the sound-based identifiers can be determined or selected by a user. The re-encoded (e.g., normalized) sound-based identifiers can be determined as normalized names associated with the vendors. A vendor (e.g., Maple) associated with a node (e.g., the node 404(3)) can be identified by the re-encoded sound-based identifier (e.g., "MPL"), which can replace each of the sound-based identifiers (e.g., "MPL" and "MPLSTG") associated with the node. For example, the database utilized to store and maintain the sound-based identifiers (e.g., "MPL" and "MPLSTG") associated with the node can be updated to replace the sound-based identifiers (e.g., "MPL" and "MPLSTG") with the re-encoded sound-based identifier (e.g., "MPL"). By replacing the sound-based identifiers (e.g., "MPL" and "MPLSTG") with the re-encoded sound-based identifier (e.g., "MPL"), queries to the database can be utilized to retrieve data associated with a vendor based on the re-encoded sound-based identifier.

In some examples, the normalized sound-based identifiers can be utilized to determine vendor names by determining a relationship between the normalized sound-based identifiers and the text-based identifiers encoded to generate the initial sound-based identifiers. For example, a vendor name determined based on a normalized sound-based identifier can be included in data provided in response to a query to the database.

Therefore, and as described herein, sound-based identifiers that initially are included in a giant cluster can be sorted into individual clusters. All of the sound-based identifiers associated with a same vendor can be sorted by a node of the prefix tree and into an array defined as a cluster. By grouping the initial (e.g., first) sound-based identifiers that are associated with the same vendor into the same cluster, the sound-based identifiers can be re-encoded as the same (e.g., second) sound-based identifier. The re-encoded (e.g., second) sound-based identifier can replace all of the initial (e.g., first) sound-based identifiers. Re-encoding of the sound-based identifiers can continue until a terminal condition is satisfied. The terminal condition for "re-encoding" can be satisfied based on, for each cluster or sub-cluster, metadata values respectively associated with the cluster or the sub-cluster having the same metadata values, or on the cluster or the sub-cluster being associated with, or utilized to determine, not more than one additional sub-cluster in a subsequent tier. The database can be queried based on the re-encoded sound-based identifier to retrieve information associated with any entry previously identified by the initial sound-based identifiers. By utilizing the re-encoded sound-based identifier to access, modify, or delete some of all of the data in the database entries for the same vendor, results from queries are more consistent and complete. Processing resources are also conserved due to few queries being required, and due to the re-encoded sound-based identifier being the same size or smaller than any of the initial sound-based identifiers. A preference and/or priority associated with vendor characteristics can be utilized to select which type of metadata (e.g., a highest amount of spent money associated with a vendor associated with a sound-based identifier, a length of a relationship (e.g., a longest relationship) associated with a vendor associated with a sound-based identifier, a tax identifier associated with a vendor associated with a sound-based identifier) is utilized to re-encode the sound-based identifier. By prioritizing the vendor characteristics, the metadata can be selected, and the re-encoded sound-based identifier can be customized, based on the type of vendor.

Furthermore, each of the clusters and/or the sub-clusters can include a root-to-leaf path of nodes of a prefix tree, and an array of strings at a node of the tree. An application can transmit data to a computing device, based on a query of the database utilizing the prefix tree. The longest common prefix can be used as a pseudo-clustering mechanism. Utilizing the prefix tree to determine the normalized sound-based identifier can provide a canonical approach to effectively store representations of the initial sound-based identifiers in a data structure. As many strings as possible can be associated with a node and/or a cluster based on the prefix, and subsequent nodes associated with subsequent characters after the last character in the prefix.

Figure 5:
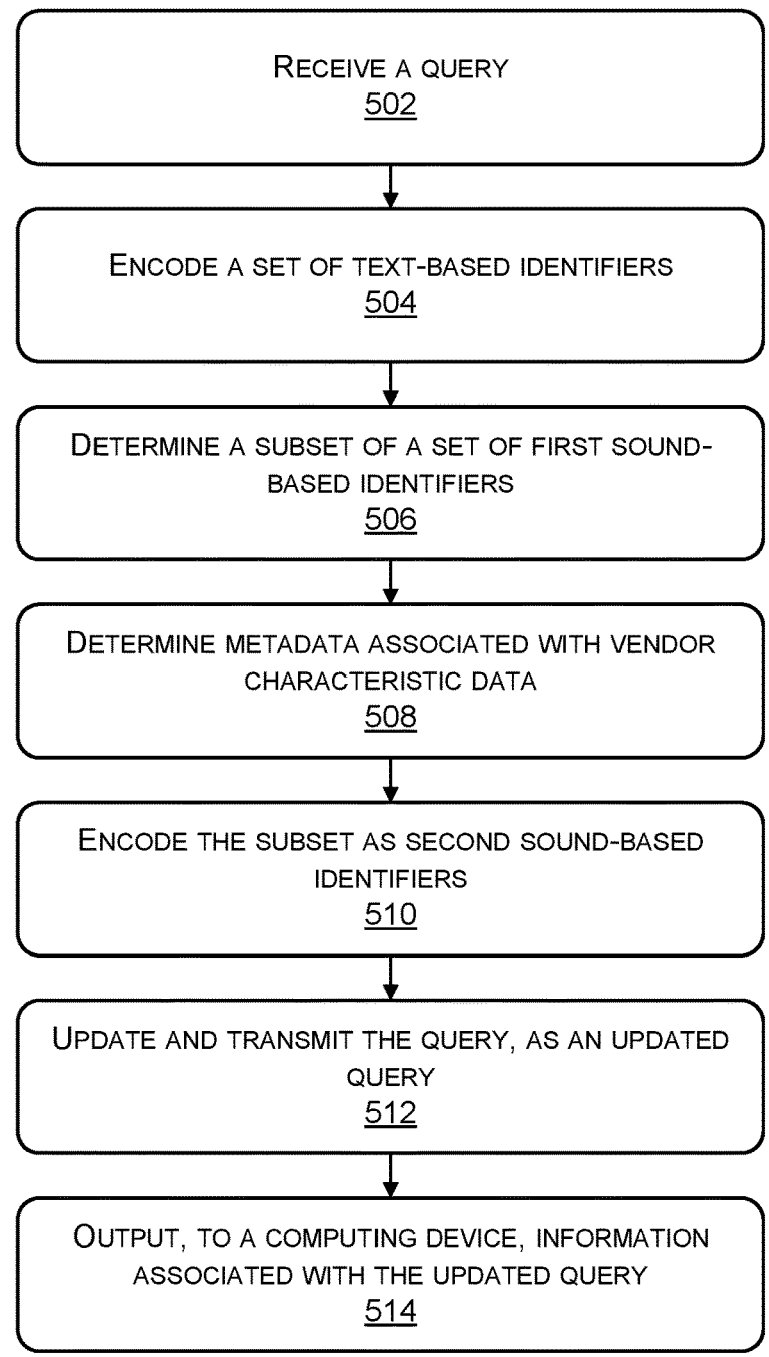
FIG. 5 illustrates an example process 500 that includes database management for sound-based identifiers.

FIG. 5 illustrates an example process 500 that includes database management for sound-based identifiers.

The example process 500 can be performed by one or more server computers (e.g., server computer(s) 104) or another component, in connection with other components discussed herein.

At operation 502, the process can include receiving a query (e.g., a request, or a string of un-normalized text-based identifiers). The query can be associated with information stored in a database and can include an indication of at least one text-based identifier.

At operation 504, the process can include encoding a set of text-based identifiers. The set can include text-based identifiers associated with one or more vendors. The text-based identifiers can be associated with data managed by a database, based on the text-based identifiers. The set of text-based identifiers (e.g., a first set of text-based identifiers) can be encoded as sound-based identifiers (e.g., first sound-based identifiers) including text symbols associated with the text-based identifiers. The set of text-based identifiers can be encoded by determining that a plurality of the text-based identifiers are associated with similar phonetic characteristics.

At operation 506, the process can include determining a subset of a set of first sound-based identifiers. The subset of the first sound-based identifiers (e.g., first subset of the first sound-based identifiers) can be sorted into one or more clusters.

At operation 508, the process can include determining metadata associated with vendor characteristic data. The vendor characteristic data can be associated with the text-based identifiers and can include at least one of geographical locations or tax identifiers.

At operation 510, the process can include encoding, as second sound-based identifiers, a second subset of the first sound-based identifiers, based on the metadata. The second sound-based identifiers can include a character associated with a node, and a suffix character string associated with the character. The second subset of the first sound-based identifiers encoded as the second sound-based identifiers can be further sorted into sub-clusters based on the text symbols. The second subset can be encoded by sorting the second sound-based identifiers as part of a prefix tree. An evaluated flag associated with at least one of the sub-clusters can be updated based on the second subset being encoded as the second sound-based identifiers.

At operation 512, the process can include updating and transmitting the query, as an updated query. For example, the updated query can be updated based on the second sound-based identifiers and then transmitted.

At operation 514, the process can include outputting, to the computing device, information associated with updated query. For example, the information can be received from the database and output to the computing device.

Figure 6:
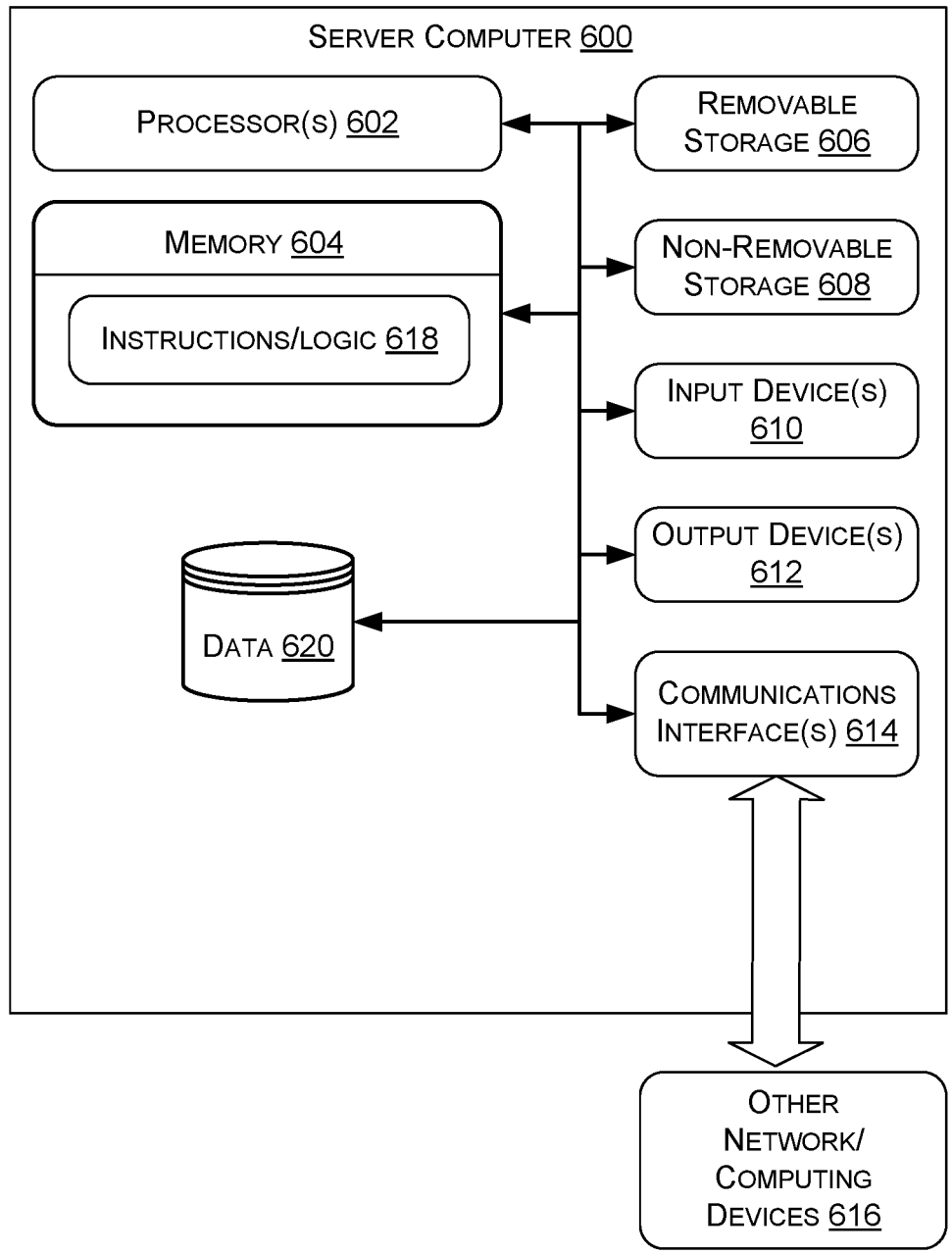
FIG. 6 illustrates a block diagram of a centralized server, in accordance with some examples of the present disclosure.

FIG. 6 illustrates is a block diagram of a server computer 600, in accordance with some examples of the present disclosure. The server computer 600 as shown in FIG. 6 can correspond to any of the server computer(s) 104 of FIG. 1 and can be used to implement the various operations described herein, including the heuristic depicted in any of FIGS. 2-5. It is to be understood in the context of this disclosure that the server computer 600 can be implemented as a single device or as a plurality of devices with modules and data distributed among them. For example, the server computer 600 may include one or more processors 602 and a memory 604 storing the normalized database entries 106 and/or the pre-processed database entries 108, as described herein. Also, the server computer 600 may include a removable storage 606, non-removable storage 608, one or more input device(s) 610, one or more output device(s) 612, and one or more communication interfaces (e.g., transceiver(s)) 614. The memory 604 may store instructions/logic 618 used to implement, independently or together with data 620, the various operations described herein, including the heuristic depicted in any of FIGS. 2-5.

In various embodiments, the memory 604 can be a volatile memory (such as RAM), non-volatile memory (such as ROM, flash memory, etc.) or some combination of the two. The instructions/logic 618 and/or the data 620 can comprise methods, threads, processes, applications or any other sort of executable instructions. The memory 604 and/or the data 620 can also include files and databases.

The server computer 600 can include additional data storage devices (removable and/or non-removable media) such as, for example, magnetic disks, optical disks, and/or tape. Such additional storage is illustrated in FIG. 6 by the removable storage 606. Tangible computer-readable media can include volatile and nonvolatile, removable and non-removable media implemented in any method or technology for storage of information, such as computer-readable instructions, data structures, program modules, or other data. The memory 604, the removable storage 606 and the non-removable storage 608 are all examples of computer-readable storage media. Computer-readable storage media can therefore include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the server computer 600. Any such tangible computer-readable media can be part of the server computer 600.

The one or more input device(s) 610 may be, for example, a keypad, a keyboard, a cursor control, a touch-sensitive display, voice input device, etc. The output device(s) 612 may be devices such as, for example, a display, speakers, printers, haptic feedback, etc. These devices are well known in the art and need not be discussed at length here.

As illustrated in FIG. 6, the server computer 600 may also include one or more wired or wireless communication interface(s) 614. For example, the communication interface(s) 614 can include a network interface card (NIC), a network adapter, a LAN adapter, or a physical, virtual, or logical address to connect to a network associated with the server computer(s) 104. To increase throughput when exchanging wireless data, the transceivers 614 can utilize multiple-input/multiple-output (MIMO) technology. The communication interface(s) 614 can comprise any sort of wireless transceivers capable of engaging in wireless, radio frequency (RF) communication with other network/computing device 616. The transceivers 614 can include other wireless modems, such as a modem for engaging in Wi-Fi, WiMAX, Bluetooth, or infrared communication.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A system comprising:
one or more processors; and
a non-transitory computer-readable medium comprising computer-readable instructions, the computer-readable instructions executable by the one or more processors to perform operations comprising:
receiving, from a computing device, a query associated with information stored in a database, the query comprising an indication of a text-based identifier;
receiving, based at least in part on the indication, a set of text-based identifiers;
encoding, via an algorithm, the set of text-based identifiers as first identifiers;
determining, based at least in part on the set of text-based identifiers, a first subset of the first identifiers, the first subset being sorted into one or more clusters;
determining metadata associated with vendor characteristic data, the vendor characteristic data associated with the set of text-based identifiers;
encoding, based at least in part on the metadata, a second subset of the first identifiers as second identifiers;
updating the query, as an updated query, based at least in part on the second identifiers;
transmitting the updated query to the database;
receiving, from the database, information associated with the updated query; and
outputting, to the computing device, the information.

2. The system of claim 1, wherein encoding the second subset further comprises sorting the second identifiers as part of a prefix tree.

3. The system of claim 1, wherein encoding the set of text-based identifiers further comprises encoding the set of text-based identifiers based on determining that a plurality of the set of text-based identifiers are associated with similar phonetic characteristics.

4. The system of claim 1, wherein the second identifiers comprise a character associated with a node, and a suffix character string associated with the character.

5. The system of claim 1, the operations further comprising:
updating an evaluated flag based on the second subset being encoded as the second identifiers, the evaluated flag associated with at least one sub-cluster.

6. A method comprising:
receiving, from a computing device, a query associated with information stored in a database;
encoding, via an algorithm, a set of text-based identifiers as first identifiers;
determining, based at least in part on the set of text-based identifiers, a first subset of the first identifiers;
determining metadata associated with vendor characteristic data, the vendor characteristic data associated with the set of text-based identifiers;
encoding, based at least in part on the metadata, a second subset of the first identifiers as second identifiers; and
transmitting the query based at least in part on the second identifiers.

7. The method of claim 6, wherein the first subset is sorted into one or more clusters, and the second subset is further sorted into sub-clusters based at least in part on text symbols associated with the set of text-based identifiers.

8. The method of claim 6, wherein encoding the second subset further comprises sorting the second identifiers as part of a prefix tree.

9. The method of claim 6, wherein encoding the set of text-based identifiers further comprises encoding the set of text-based identifiers based at least in part on determining that a plurality of the set of text-based identifiers are associated with similar phonetic characteristics.

10. The method of claim 6, wherein the second identifiers comprise a character associated with a node, and a suffix character string associated with the character.

11. The method of claim 6, wherein:
the first subset is sorted into one or more clusters, and the second subset is further sorted into sub-clusters;
additional subsets are encoded based at least in part on the metadata; and
encoding the additional subsets ceases based at least in part on, for each sub-cluster, metadata values associated with the sub-cluster being the same, or on the sub-cluster being utilized to determine not more than one additional sub-cluster in a subsequent tier.

12. The method of claim 6, wherein determining the first subset of the first identifiers further comprises:
determining, for at least one identifier of the first identifiers, a node associated with the at least one identifier, based at least in part on a business attribute associated with all of the at least one identifier.

13. The method of claim 6, wherein the metadata comprises at least one of an amount of spent money associated with each of the second identifiers, a length of time of a relationship associated with each of the second identifiers, or a tax identifier associated with each of the second identifiers.

14. The method of claim 6, wherein the second subset comprises a normalized identifier utilized to replace more than one of the first identifiers, and
wherein transmitting the query further comprises:
transmitting the query based at least in part on the normalized identifier.

15. One or more non-transitory computer-readable media storing instructions that, when executed, cause one or more processors to perform operations comprising:
receiving, from a computing device, a query associated with information stored in a database;
encoding, via an algorithm, a set of text-based identifiers as first identifiers;
determining, based at least in part on the set of text-based identifiers, a first subset of the first identifiers;
determining metadata associated with vendor characteristic data, the vendor characteristic data associated with the set of text-based identifiers;
encoding, based at least in part on the metadata, a second subset of the first identifiers as second identifiers; and
transmitting the query based at least in part on the second identifiers.

16. The one or more non-transitory computer-readable media of claim 15, wherein the first subset is sorted into one or more clusters, and the second identifiers are further sorted into sub-clusters based at least in part on text symbols associated with the set of text-based identifiers.

17. The one or more non-transitory computer-readable media of claim 15, wherein encoding the second subset further comprises sorting the second identifiers as part of a prefix tree.

18. The one or more non-transitory computer-readable media of claim 15, wherein encoding the set of text-based identifiers further comprises encoding the set of text-based identifiers based at least in part on determining that a plurality of the set of text-based identifiers are associated with similar phonetic characteristics.

19. The one or more non-transitory computer-readable media of claim 15, wherein the second identifiers comprise a character associated with a node, and a suffix character string associated with the character.

20. The one or more non-transitory computer-readable media of claim 15, the operations further comprising:
updating an evaluated flag based at least in part on the second subset being encoded as the second identifiers, the evaluated flag associated with at least one sub-cluster of the second identifiers.

* * * * *